F. J. DECKER.
MECHANICAL FOOT OPERATED CLUTCH.
APPLICATION FILED MAR. 17, 1916.
1,208,753.
Patented Dec. 19, 1916.
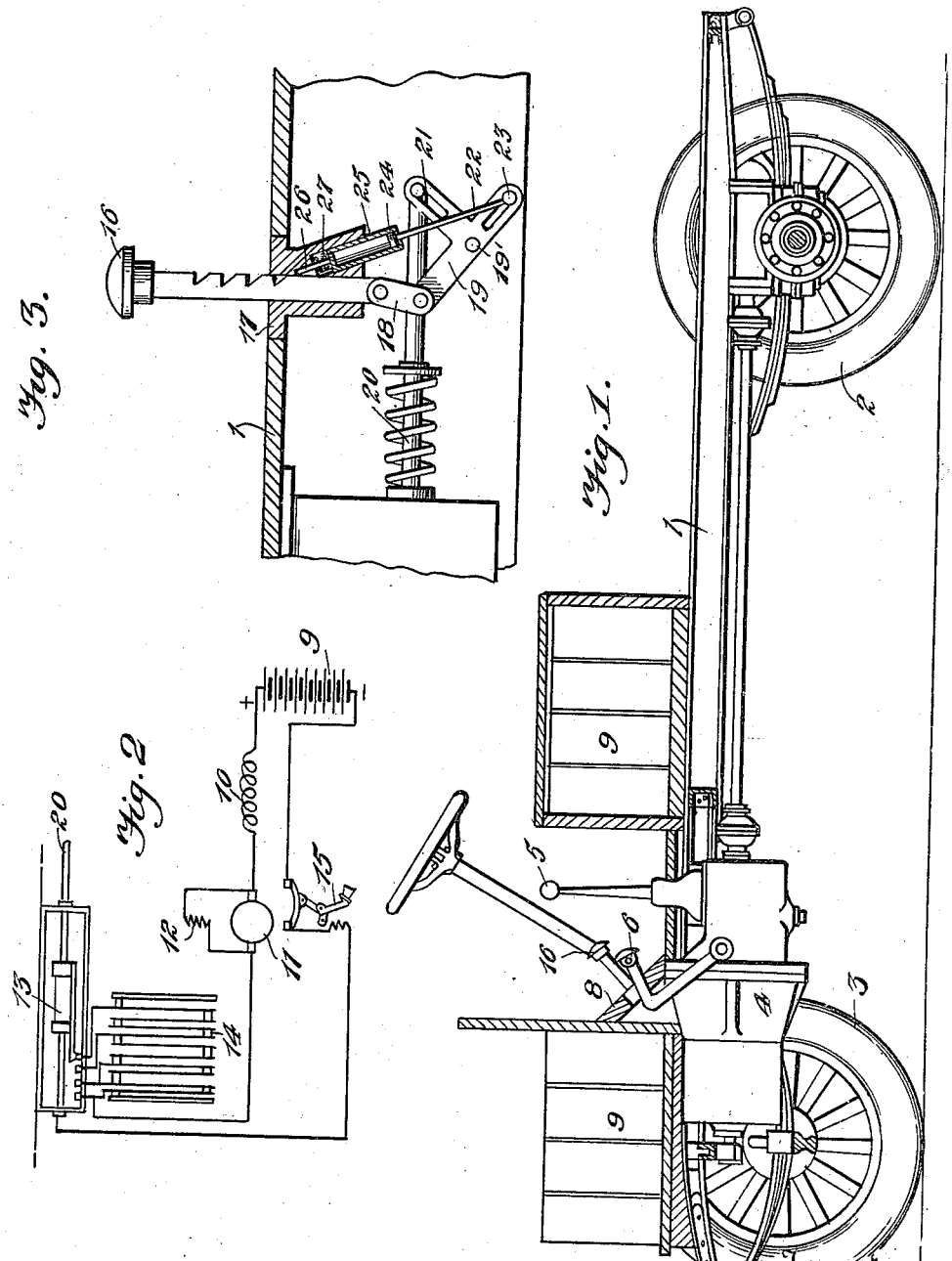

UNITED STATES PATENT OFFICE.

FREDERICK J. DECKER, OF ROCHESTER, NEW YORK, ASSIGNOR TO SHAFER-DECKER COMPANY, OF ROCHESTER, NEW YORK, A CORPORATION OF NEW YORK.

MECHANICAL FOOT-OPERATED CLUTCH.

1,208,753.

Specification of Letters Patent.

Patented Dec. 19, 1916.

Original application filed June 9, 1915, Serial No. 33,171. Divided and this application filed March 17, 1916. Serial No. 84,863.

*To all whom it may concern:*

Be it known that I, FREDERICK J. DECKER, a resident of the United States, and residing at Rochester, in the county of Monroe and the State of New York, have invented certain new and useful Improvements in Mechanical Foot-Operated Clutches for Switches Used in Connection with Electric Motor-Vehicles.

The present invention consists of means for automatically operating electrical switches and more particularly to such switches used in connection with electric motor vehicles, and an object of the invention is to provide an automatically operated foot pedal used in connection with switches of the character aforesaid, whereby upon a continuous force upon the pedal the switch will be operated at intervals to close electric circuit and when the switch advances to each point, it will be held at a predetermined interval thereby permitting the motor to run a short time at a given rate at each degree advanced by the switch thereby properly controlling the current to the motor.

With the above and other objects in view the invention consists of the novel features of construction combination, formation and arrangement of parts as will be hereinafter more fully described and particularly pointed out in the appended claims.

The invention will be best understood by having reference to the accompanying drawings forming a part of this specification in which;

Figure 1, illustrates a sectional view of an electric truck showing the position of an embodiment of the invention as applied thereto. Fig. 2, is a diagrammatic view of the electrical connections, and Fig. 3, is a vertical section through the toe board of the truck frame showing a mechanism for operating the switch embodying the invention.

Referring now more particularly to the drawings wherein like and corresponding parts are designated by similar reference characters throughout the several views.

In the drawing the numeral 1 indicates the frame of the electric truck supported by the rear driving wheels 2, and the front steering wheels, one of which is indicated by the numeral 3.

The numeral 4 indicates the casing suspended from the frame of the truck in which is arranged the motor, clutch and sliding gear transmission for driving and controlling the propulsion of the rear wheels of the truck as is more clearly shown and described in my co-pending application dated June 9, 1915, Serial Number 33,171, and of which the present application is a division.

A lever 5 is shown applied to the truck for controlling the operation of the sliding gear transmission and the numeral 6 indicates the foot pedal for controlling the clutch arranged within the casing 4, and this lever and foot pedal are projected through the toe board 8 of the frame of the truck.

On top of the frame of the truck is carried the storage battery cells which are divided into two sections for convenience. The sections being numbered 9, one of these sections being placed forward of the dash board and the other under the driver's seat. These storage cells are connected up in a single battery which may have any desired voltage. These batteries are provided for the purpose of driving the motor by connections which I will now describe.

In series with the storage battery is placed a choke coil and the armature 11 and field 12 of the motor, the armature and field being preferably parallel with each other. The choke coil serves to keep down the rush of current that would strain the batteries and tend to throw out the circuit breaker when the motor is being started. Also in series with the storage battery is a sliding switch 13 and the resistance coils 14, the resistance coils being connected to a series of stationary terminals of contacts in the sliding switch with which the sliding plate of the switch can make contact. Also in series with the storage battery is the overload circuit breaker 15 which is set to break the circuit when a predetermined amount of current flows from the storage battery.

The sliding switch 13 will be placed under the toe board 8 through which the stem of the foot pedal 16 extends, the stem being mounted in a socket 17 set in the toe board. To the lower end of this stem is connected a link 18, which in turn is connected to one end of a bell crank 19. This bell crank is pivotally mounted upon the frame of the truck as in 19' and to one arm of the bell crank is connected a rod 20 by means of a slot and pin connection 21, and this rod 20 being connected to the sliding switch 13 for operating the latter. Connected to the other arm of the bell crank by means of the slot and pin connection 23 is a piston rod 22 having secured to its opposite end a piston 24 which operates within a cylinder 25. This cylinder is slidably mounted within a socket formed within the bushing 17 carried by the toe board and the cylinder has mounted on its head a rigidly mounted pawl 26. This pawl passes through an opening in the bushing 17 and is adapted to engage with suitable ratchet teeth provided on the stem of the foot pedal 16. This cylinder 25 is provided with a vent hole in its head and a coil spring 27 encircles the pawl 26 which presses against the head of the cylinder at one end and the opposite end of this coil spring presses against the inner wall of the socket formed within the bushing 17.

When the operator wishes to advance the sliding contact from one stationary contact to another, he presses down on the foot pedal 16. This will advance the sliding contact one step at which point the pedal will be arrested by the engagement of the pawl 26 with the first tooth on the stem 16. It will be understood that the tension of the spring 28 normally holds the pawl 26 out of engagement with the ratchet on the stem 16 and when the pedal is pressed the bell crank 19 moves the piston and compresses the air in the cylinder 25 causing the cylinder to move forward against the resistance of the spring 27. The compressed air gradually exhausts through the vent opening within the head of the cylinder and when the air is exhausted through this opening the spring 27 presses the cylinder back, carrying the pawl out of engagement with the stem. During this time the motor will be acquiring speed and the size of the vent hole is such that the proper time will be sustained in withdrawing the pawl to insure the development of the proper speed of the motor. By then depressing the pedal 16 or exerting a constant force upon the same, the sliding contact will advance to another stationary contact within the switch 13 and again compressing the air in the cylinder whereby the pawl 26 will be forced into engagement with the second tooth of the ratchet on the stem of the pedal 16. In like manner the pedal can be advanced to the third or fourth steps at which point the resistance will be cut down and the motor will be running at top speed. As a piston makes four steps in advancing in the cylinder, the cylinder must be made correspondingly long. When the pedal is released the spring 27 will expand and restore the switch to its original position and to assist in forcing the sliding switch back to its original position a coil spring is provided which encircles the rod 20 as better illustrated in Fig. 3.

Whereas I have shown the simple and preferred means for carrying out my invention, it is of course to be understood that no limitation is necessarily made to the precise structural details therein exhibited, but the right is hereby reserved to any changes or modifications to which recourse may be had that come within the scope of the claims without departing from the spirit of the invention or sacrificing the efficiency of the same.

Having fully described my invention and what I claim as new and desire to secure by Letters Patent is:

1. In combination a controller, manually operated speed control means for locking said controller against movement, comprising a reciprocating element having notches, a connection including a lever between said element and the controller, a pawl actuated by movement of said lever whereby to position the pawl to engage the notches on the element, means associated with the pawl to temporarily hold same in engagement with the notches, and means movable independent of the lever for retracting the pawl to permit further movement of the reciprocating element.

2. In combination a controller, a reciprocating element having holding means, a lever pivoted to the reciprocating element to operate the controller, a cylinder having a vent and mounted adjacent the reciprocating element, a piston operating in the cylinder, means connecting the piston to the lever, a pawl attached to the piston and adapted to temporarily engage with the holding means on the reciprocating element when the latter in depressed, and means for withdrawing the pawl when the air in the cylinder exhausts through the vent.

3. In combination, a controller, a reciprocating element having pawl engaging means, means for connecting the reciprocating member with the controller including a lever, a cylinder having a vent, a pawl carried by the cylinder to temporarily engage the holding means on the reciprocating element, a piston operating in the cylinder, means connecting the piston to the lever, and means for withdrawing the pawl from the pawl engaging means independently of the movement of the lever and its connection with the piston.

4. In combination, a controller, a starting element having pawl engaging means, a connection between the element and the controller, a pawl operated by the connection to cause same to temporarily engage the pawl engaging means, and means acting independently of the connection to withdraw the pawl from the pawl engaging means, whereby to permit further movement of the starting element.

5. In combination, a controller, a foot pedal, means for operatively connecting the foot pedal with said controller, means for engaging said foot pedal whereby its successive operations may be automatically controlled, said latter means comprising a cylinder carrying a pawl, a piston in the cylinder, and a spring for withdrawing the pawl and cylinder to normal position.

6. In combination, a controller, a foot pedal, a link connected with the said controller, a bell crank connecting said link with said foot pedal, a pawl adapted to engage said foot pedal, and means for connecting said pawl with the bell crank, whereby upon the successive operations of the foot pedal the pawl will be automatically thrown into engagement with said foot pedal, and means operating independently of the foot connecting means and the bell crank for automatically withdrawing the pawl from the foot pedal.

7. In combination, a controller, a link connected to said controller, a foot pedal having ratchet teeth, a bell crank connecting said link with said foot pedal, a pawl for engaging the ratchet teeth, a spring for normally holding said pawl out of engagement with said ratchet teeth, a cylinder carried by said pawl, a piston operatively connected to said bell crank, whereby upon the successive operations of the foot pedal the pawl will be automatically forced into and out of engagement with the ratchet teeth, for the purpose set forth.

In witness whereof, I hereunto subscribe my name to this specification in the presence of two witnesses.

FREDERICK J. DECKER.

Witnesses:
VIOLA SCHULER,
GRACE L. WILLIAMS.

Copies of this patent may be obtained for five cents each, by addressing the "Commissioner of Patents, Washington, D. C."